W. L. PAUL & R. J. ALTGELT.
PLOW.
APPLICATION FILED NOV. 7, 1907.
914,506.
Patented Mar. 9, 1909.
3 SHEETS—SHEET 1.
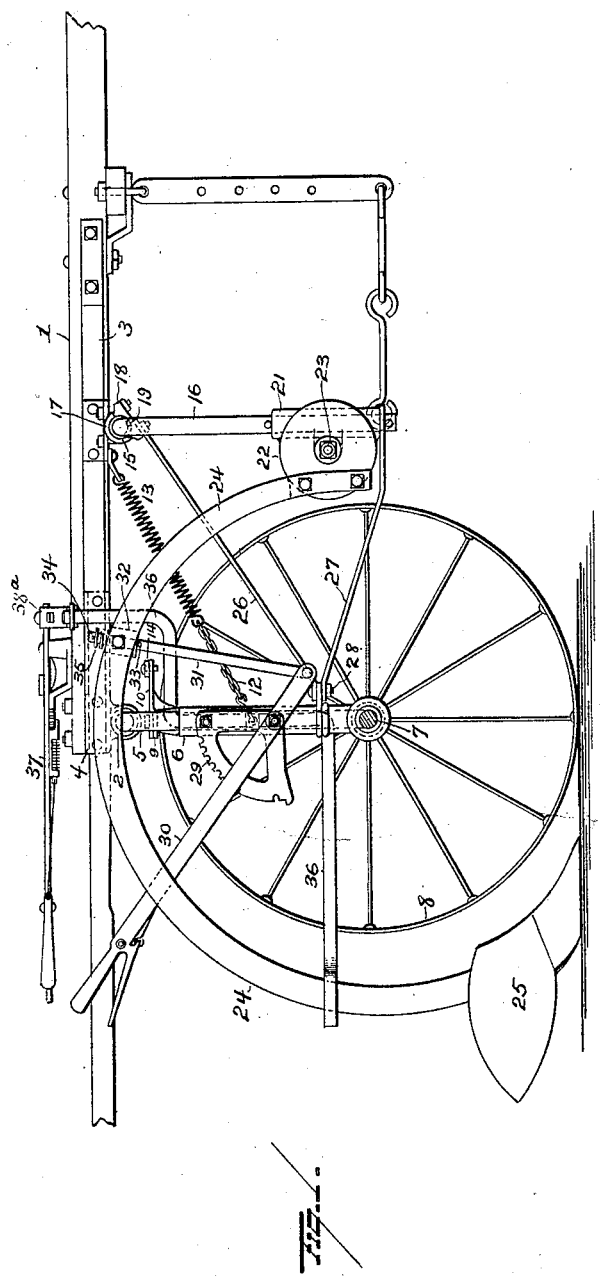
WITNESSES
INVENTORS
W. L. Paul
R. J. Altgelt
By H. A. Seymour Attorney

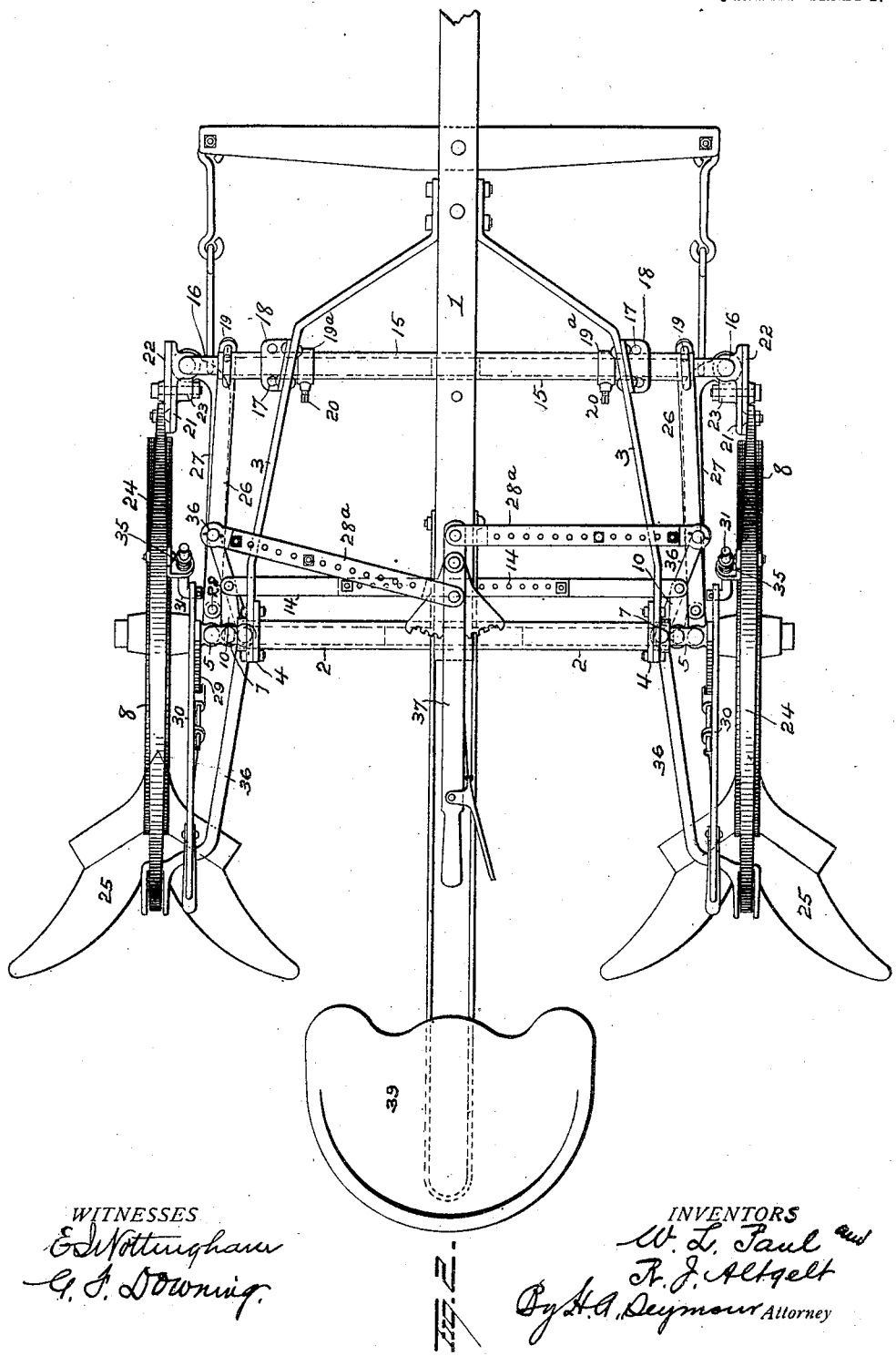

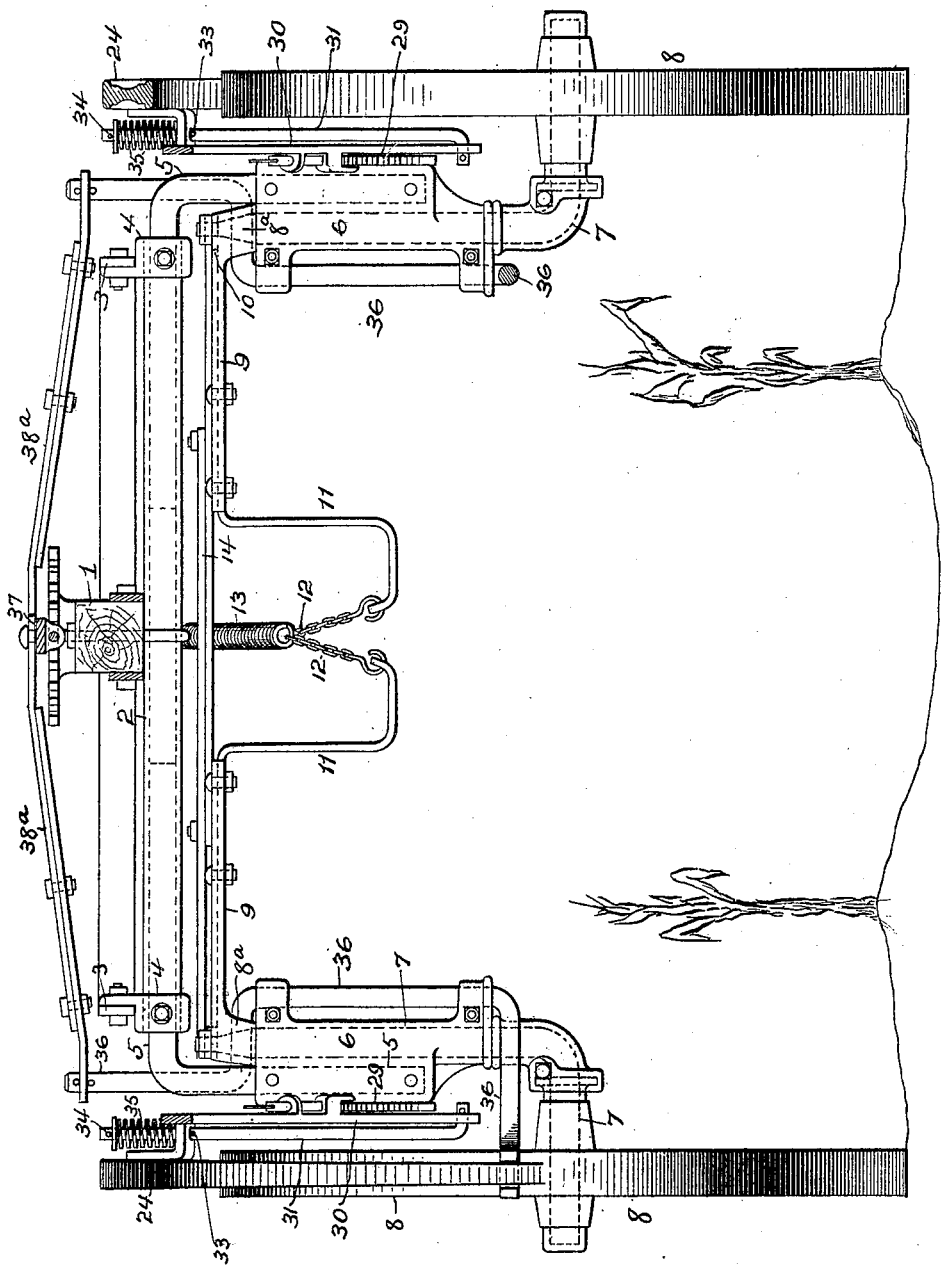

UNITED STATES PATENT OFFICE.

WILLIAM L. PAUL AND RUDOLPH J. ALTGELT, OF SOUTH BEND, INDIANA, ASSIGNORS TO OLIVER CHILLED PLOW WORKS, OF SOUTH BEND, INDIANA.

PLOW.

No. 914,506.  Specification of Letters Patent.  Patented March 9, 1909.

Application filed November 7, 1907. Serial No. 401,125.

*To all whom it may concern:*

Be it known that we, WILLIAM L. PAUL and RUDOLPH J. ALTGELT, of South Bend, in the county of St. Joseph and State of Indiana, have invented certain new and useful Improvements in Plows; and we do hereby declare the following to be a full, clear, and exact description of the invention, such as will enable others skilled in the art to which it appertains to make and use the same.

Our invention relates to an improvement in plows especially adapted for cultivating or plowing between rows of corn, the object being to provide a machine adapted more particularly for use in rows so narrow that two animals cannot walk between adjacent rows with a pole between them.

With these ends in view our invention consists in the parts and combinations of parts as will be more fully described and pointed out in the claims.

In the accompanying drawings Figure 1 is a view in side elevation of our improved plow the near wheel being removed. Fig. 2 is a view in plan and Fig. 3 is a view in rear elevation the front arch being removed and the plow beams shown in section.

1 represents the pole secured at its rear end to tubular or pipe axle 2, and 3 are frame bars connected at their front ends to the sides of the pole and at their rear ends to the sleeve brackets 4 which latter are clamped to pipe axle 2 near the outer ends of the latter. Secured in the ends of the tubular axle 2 are the axle arms 5 each of which latter is bent at right angles as shown in Fig. 2, one member being secured within the tubular axle and the other extending vertically downward and carrying the axle supporting frame 6. Pivotally mounted in the frame 6 are the vertical members of the stub axles 7, the horizontal members or spindles thereof being mounted within the hubs of the ground wheels 8. The upper ends of stub axles 7 project above the frame 6, for the attachment of the caps 8ª, each of the latter having an inwardly projecting arm 9, and a forwardly projecting arm 10.

Adjustably secured to each inwardly projecting arm 9 is an L-shaped foot lever 11, the free ends of which are connected by chains 12 with the rear end of the rearwardly and downwardly projecting spiral spring 13, the forward end of said spring being secured to the underside of the pole.

The forwardly projecting arm 10 of caps 8ª, are connected by the straps 14, which latter are adjustably connected together at their overlapping ends, by bolts passing through holes in the two straps. These straps 14 operate to move the two wheels 8 in unison and hold them in proper relative position to each other.

The spring 13 previously referred to is constantly under tension, and normally tends to hold both wheels 8 in line without any effort or attention on the part of the operator. The spring under tension tends to pull both foot levers 11 forward while the straps 14 retain them in their proper relative position and prevent any independent movement of either. By pressing forwardly on one foot lever, the other will be moved rearwardly and both stub axles 7 will be turned so as to shift the wheels laterally. This rearward movement of one foot lever expands the spring which as before stated was originally under tension, and when the pressure on the foot lever is removed, the spring immediately restores the foot levers to their normal positions.

15 is a tube or pipe secured to pole 1 and frame bars 3 and projecting equal distance at opposite sides of the latter, and carrying at its free ends the arch sections 16. These sections 16 telescope with the tube 15, and are adjustably secured to the latter so as to permit the arch as a whole to be lengthened or shortened as necessities demand. The sections 16 are each locked to the tube by a U-shaped bolt 17, and clamping plate 18, the latter having a lug 19 which rests in a hole in pipe and engages the horizontal member of the arch section. The tube 15 and sections 16 are further secured together by collars 19ª carrying set screws 20 which latter engage the horizontal members of the arch sections 16.

Journaled on the lower ends of the arch sections 16 are the bearings 21, carrying the plow attaching plate couplings which latter are journaled on the horizontal bearing 23 on bearing 21.

Rigidly secured to the coupling 22 are the plow beams 24. Arch section 16 is on a line with wheel 8, and the plow beams 24 are curved as shown in Fig. 1 so as to partly encircle the wheel, and carry at their rear ends middle-breaker or other suitable forms of plows 25. These plows as shown in Fig. 2 rest immediately behind and partly under the wheels, thus economizing space, and providing a wheeled plow that can be successfully operated between narrow rows of corn.

The axle and front arch, are tied together and braced by the braces 26 and 27, the former extending from the top 15 of the arch to the axle at a point above the wheel-spindle, and the latter from the lower ends of the arch members 16 to the axle, both braces 26 and 27 being connected to the axle by a pin or bolt 28 which permits of the longitudinal adjustment of the axle. The fixed or central portion of the axle and arch are also braced by the frame bars 3 the front ends of the latter being attached to the pole 1.

Secured to the outer face of each axle carrying frame 6, is a toothed segment 29, to which is pivoted the lever 30, carrying a catch to engage the teeth of the segment, and hold the lever 30 in any desired position. Each lever carries a rod 31 which latter passes upwardly through a bracket 32 carried by the beam 24, the bracket 32 being located in a plane approximately above the lower end of lever 30, and also above wheel 8. 33 is a pin passing through rod 31 below bracket 32, and 34 is a pin passing through the rod above the spring 35, which is seated on the bracket 32 and embraces the upper end of rod 31. With this construction it will be seen that by depressing the rear end of levers 30, the plows will be elevated, and by elevating the rear ends of the levers the plows will be lowered, the springs 35 above the bracket tending to yieldingly hold the plows in the ground.

Pivotally mounted in the axle carrying frame 6 are the crank levers 36, the upper ends of which are bent forwardly and upwardly and are connected with the hand lever 37 respectively in front and rear of the axis 38 of the latter, by the two part adjusting straps 28ª, the two parts of each strap being connected by bolts and nuts, thereby providing for adjustments in the width of the machine. The lower ends of levers 36 project rearwardly and outwardly, their rear ends being bifurcated as shown in Fig. 2 and embracing the front and two sides of the plow beams 24. By turning hand lever to one side of the center line of the pole, the levers 36 will be turned in their bearings and both plows simultaneously shifted to one side or the other, the direction and extent of the shift, being dependent solely on the direction and extent of movement of hand lever 37.

A seat 39 is provided for the operator, and an evener and draft bars connect the pole and the lower end of the front arch 16.

With the construction, it will be seen that the machine is open and unobstructed between the wheels thus permitting the machine to straddle two rows, the plows following each animal, and plowing alternate rows, thus permitting the machine to work in rows so narrow that it could not be worked with two animals with a pole between them. In the case of a variation in the width of the rows the plows may be quickly set further apart or closer together by means of the lever 37, and for wider or narrower rows of regular width throughout, the frame of the machine can be adjusted to suit same, the lever 37 being used simply in cases where quick adjustment is required to compensate for variations in width of the rows.

While we have shown and referred to middle-breaker plows, it is clearly evident that we can use other forms of plows without departing from the spirit and scope of our invention, hence we would have it understood that we do not confine ourselves to the details shown but consider ourselves at liberty to make such changes as fairly fall within the spirit and scope of our invention.

Having fully described our invention what we claim as new and desire to secure by Letters-Patent, is:—

1. The combination with a frame, an arch axle, a front arch, and carrying wheels, of stub axles for the carrying wheels pivotally connected with the arch axle, plow beams pivotally connected with the front arch and extending rearwardly over the carrying wheels, plows secured to the rear ends of the plow beams in line with the wheels, means for shifting the stub axles, and means for shifting the plow beams on their pivotal connections with the front arch.

2. The combination with a frame mounted on wheels, and plows attached to said frame in advance of the wheels, of connected levers mounted in the frame and engaging the plow beams at their rear ends and means for actuating said levers whereby the plows are shifted laterally.

3. The combination with a frame mounted on wheels and plows attached to said frame, of connected levers mounted in the frame, each lever being bifurcated at its rear end and embracing a plow beam and means for simultaneously rocking said levers.

4. The combination with a frame, stub axles journaled thereon and wheels on the axles, of means connecting the two stub axles, and a spring for yieldingly holding both stub axles in their normal positions.

5. The combination with a frame, stub axles journaled therein and wheels on the axles, of means connecting both axles whereby they move in unison, foot rests on the levers for turning the axles and a spring tending to hold them in their normal positions.

6. The combination with a frame, stub axles journaled therein and wheels on the axles, of means connecting both axles whereby they move in unison, foot levers for turning the axles, and a spring secured at one end to the frame or pole in advance of the foot levers and at its rear end to the foot levers.

7. The combination of a frame, stub axles journaled therein, each provided with a forwardly and inwardly projecting arm, means connecting the two forwardly projecting arms, a foot lever carried by each inwardly projecting arm, and a spring connected at one end to the frame or pole and at its other end to the two levers.

8. The combination with a frame mounted on wheels and plow beams attached to the frame, of a pivoted lever, a rod connected at one end to said lever and connected near its other end with the plow beam, in a plane above the axis of the lever, and means for locking the lever.

9. The combination with a frame mounted on wheels, of a plow beam having pivotal connection with the frame in advance of the wheels and curved upwardly from its attachment to the frame and extending over the top of the wheel, a lever pivoted to the frame, and a rod carried by said lever and engaging the beam.

10. The combination with a frame mounted on wheels, of a plow beam attached to the frame in advance of the wheel and curved upwardly and over the wheel, a lever pivoted to the frame, a rod carried by said lever and passing through a bracket on the plow beam, a spring on the bracket embracing the rod and stops on the rod below the bracket and above the spring.

11. The combination with a frame mounted on wheels and plows attached to said frame, of connected levers mounted in the frame, each lever being connected at its rear end with a plow beam and means for simultaneously rocking said levers.

12. The combination with a frame, stub axles journaled thereon and wheels on the axles, of means connecting the two stub axles, and means for yieldingly holding both stub axles in their normal positions.

In testimony whereof, we have signed this specification in the presence of two subscribing witnesses.

WILLIAM L. PAUL.
RUDOLPH J. ALTGELT.

Witnesses:
FRANCIS C. NIPPOLD,
THOS. A. FREEMAN.